United States Patent
Hartlohner et al.

(10) Patent No.: US 8,282,320 B2
(45) Date of Patent: Oct. 9, 2012

(54) EIGHT-EDGED CUTTING INSERT, AND TOOL HOLDER FOR SAME

(75) Inventors: Rudi Hartlohner, Tuchenbach (DE); Igor Kaufmann, Nuremberg (DE)

(73) Assignee: Kennametal Inc., Latrobe, PA (US)

( * ) Notice: Subject to any disclaimer, the term of this patent is extended or adjusted under 35 U.S.C. 154(b) by 473 days.

(21) Appl. No.: 12/597,992

(22) PCT Filed: Feb. 2, 2008

(86) PCT No.: PCT/EP2008/000840
§ 371 (c)(1),
(2), (4) Date: Jan. 12, 2010

(87) PCT Pub. No.: WO2008/138414
PCT Pub. Date: Nov. 20, 2008

(65) Prior Publication Data
US 2010/0119313 A1    May 13, 2010

(30) Foreign Application Priority Data
May 14, 2007   (DE) .......................... 10 2007 022 535

(51) Int. Cl.
*B23B 27/16*   (2006.01)
*B23C 5/20*   (2006.01)
(52) U.S. Cl. ........................................ 407/113; 407/114
(58) Field of Classification Search .................. 407/113, 407/114, 115, 116
See application file for complete search history.

(56) References Cited

U.S. PATENT DOCUMENTS

| | | |
|---|---|---|
| 3,142,110 A | 7/1964 | Hertel |
| 3,490,117 A | 1/1970 | Hertel |
| 4,294,566 A * | 10/1981 | Boone .......................... 407/114 |
| 4,636,116 A | 1/1987 | Shikata |
| 5,442,981 A | 8/1995 | Vegh |
| 5,639,189 A | 6/1997 | Hoefler |
| 5,810,518 A | 9/1998 | Wiman et al. |
| 5,820,308 A | 10/1998 | Hoefler |
| 5,855,457 A | 1/1999 | Arai et al. |
| 6,050,751 A | 4/2000 | Hellstrom |
| 6,053,672 A | 4/2000 | Satran et al. |
| 6,196,771 B1 * | 3/2001 | Andersson .................... 407/113 |
| 6,742,969 B1 | 6/2004 | Hoefler |
| 6,769,844 B2 | 8/2004 | Waggle |
| 6,811,359 B2 | 11/2004 | Craig |
| 6,877,935 B2 * | 4/2005 | Schlemmer et al. ............ 407/66 |
| 6,929,428 B1 | 8/2005 | Wermeister et al. |
| 7,063,489 B2 | 6/2006 | Satran |
| 7,094,007 B2 | 8/2006 | Satran et al. |

(Continued)

FOREIGN PATENT DOCUMENTS

| | | |
|---|---|---|
| DE | 1 232 436 | 1/1967 |
| DE | 103 57 811 A1 | 7/2004 |
| EP | 1 380 375 A1 | 1/2004 |

(Continued)

*Primary Examiner* — Will Fridie, Jr.
(74) *Attorney, Agent, or Firm* — Larry R. Meenan, Esq.

(57) ABSTRACT

The invention relates to an eight-edged rotatable and reversible cutting insert having two opposite, substantially square base surfaces which are twisted relative to one another about a central axis running perpendicularly to said base surfaces, and having four identical side surfaces, wherein a main lip is formed between each base surface and each side surface. A bearing surface is formed between two chip grooves which extend along the associated main lip of the respective side surface, said bearing surface extending symmetrically beyond the groove ends of the adjacent chip groove and transversely to the main lips until its adjoins the latter.

19 Claims, 5 Drawing Sheets

U.S. PATENT DOCUMENTS

| | | | |
|---|---|---|---|
| 7,147,407 B2 * | 12/2006 | Satran | 407/42 |
| 7,976,250 B2 * | 7/2011 | Fang et al. | 407/113 |
| 2004/0013478 A1 | 1/2004 | Dehn et al. | |
| 2005/0063792 A1 | 3/2005 | Satran | |
| 2005/0214081 A1 | 9/2005 | Satran et al. | |
| 2010/0303563 A1 * | 12/2010 | Fang et al. | 407/113 |

FOREIGN PATENT DOCUMENTS

| | | |
|---|---|---|
| EP | 1 480 774 B1 | 12/2004 |
| EP | 1 572 407 B1 | 9/2005 |
| JP | S5151579 | 10/1974 |
| JP | H685712 U | 12/1994 |
| WO | 03/074218 A1 | 9/2003 |

\* cited by examiner

EIGHT-EDGED CUTTING INSERT, AND TOOL HOLDER FOR SAME

BACKGROUND OF THE INVENTION

1) Field of the Invention

The invention relates to an eight-edged, rotatable and reversible cutting insert having two opposite, substantially square base surfaces which are twisted relative to one another about a central axis running perpendicularly to said base surfaces, and having four identical side surfaces, wherein a main lip is formed between each base surface and each side surface. It also relates to a tool holder for such a cutting insert.

2) Description of the Related Art

A multi-edged cutting body made of a hard cutting material is known from DE-B 1 232 436, said cutting body being formed from two truncated-pyramid-like cutting body halves, the base surfaces of which, located opposite one another while forming four identical side surfaces, are twisted relative to one another. The side surfaces form with both base surfaces a total of eight cutting edges which extend in each case over the entire length of the side surfaces and of the base surfaces. A central hole running at right angles to the base surfaces of the cutting body halves and therefore perpendicularly to the central axis serves to accommodate a screw, by means of which the cutting insert can be fastened in a recess of a tool holder. The four identical side surfaces have flat rake faces which are assigned to and are adjacent to the respective cutting edges and which extend transversely to the central axis along the entire cutting edge and in the direction of the central axis up to the side surface center, in which the two cutting body halves are adjacent to one another.

In the tangential cutting tip used, for example, in a turning tool, the eight cutting edges thereof can be brought into use one after the other by rotating and reversing the cutting tip in the tool holder.

The object of the invention is to specify an eight-edged cutting insert of the type mentioned at the beginning which is improved in particular with regard to a reliable tip seat in a tool holder. Furthermore, a tool holder which is especially suitable for accommodating such a cutting insert is to be specified.

SUMMARY OF THE INVENTION

This object is achieved according to the invention by the features of claim 1. Advantageous configurations, developments and variants are the subject matter of the dependent claims referring back to claim 1.

The eight-edged rotatable and reversible cutting insert according to the invention has a bearing surface in each side surface between the chip grooves, said bearing surface extending symmetrically beyond the groove ends of the adjacent chip groove and transversely to the main lips until it adjoins the latter.

In an advantageous configuration, the main lips extend only over part of the length of the respective side surface. In particular, the respective main lip extends between the associated corner edge and a rounded-off edge section of this base surface. The corner edges are preferably rounded off or are of circular or curved design. The rounded-off edge section expediently forms, at least partly or sectionally, the secondary flank of the secondary lip of the adjacent side surface.

The bearing surface has a roughly circular or oval surface contour having a waisted central surface region drawn in in a hyperbolic manner. In this configuration, the bearing surface has the shape of a battle-axe. The chip grooves are in this case formed between the waisted central surface region and the diagonally opposite corner edges (corner radii).

The bearing surface also expediently extends in the longitudinal direction of the main lips over the entire side surface. In an especially advantageous surface form or geometry for this purpose, the bearing surface, in a symmetrical manner, in particular in a rotationally symmetrical manner with respect to the waisted central surface region, has two wedge-shaped surface regions. The surface tips of the latter are preferably brought up to the secondary lips of the adjacent side surfaces. In this variant, the respective wedge-shaped surface region of the bearing surface, in particular in conjunction with the rounded-off edge section, forms the part or a part of the secondary flank for the secondary lip of the adjacent side surface.

The respective chip groove has a groove corner which is diagonally opposite the respective corner edge and is suitably rounded-off and is in particular circular or curved. With this groove corner, the chip groove adjoins the bearing surface. The chip grooves are preferably designed as chip pockets drawn into the side surface. These chip pockets extend along the main lip assigned thereto between the corner edge, at which the main lip merges into the secondary lip, up to a rear chip pocket end. The chip pocket ends within this side surface at the respective chip pocket end. The chip pockets in this case, as well as the secondary lips, the main lips and the corner edges which connect said secondary and main lips and are expediently of circular or curved design, are arranged diagonally opposite one another. Each chip pocket and also the main lip assigned thereto and the secondary lip likewise assigned to said chip pocket and running substantially transversely to the main lip are therefore always located in the region of one of the two cutting body halves or cutting insert halves, the base surfaces of which, spaced apart by the width of the side surface, are twisted relative to one another. The other lips (main and secondary lips) together with the chip pocket assigned to them are then arranged within the same side surface on the opposite side in the other cutting body half.

The bearing surface is raised between the two chip pockets of the respective side surface and relative to the pocket bottoms of the two chip pockets. To the rear of the respective chip pocket end, the bearing surface extends symmetrically up to the main lips opposite one another, whereas a comparatively narrow surface region in the shape of the waisted surface region of the bearing surface is provided in the region between the chip pockets.

In principle, each chip pocket has a comparatively long pocket ridge which is brought up to the main lip assigned to this chip pocket. A further, comparatively narrow pocket ridge of the same chip pocket is brought up to the secondary lip connected to this main lip via the corner edge. In this case, in an advantageous configuration, the pocket ridge or each of these pocket ridges can be arched inward (concavely) toward the central axis, with a sunken main lip and a sunken secondary lip, respectively, being formed. Consequently the main lip and/or the secondary lip are/is drawn in toward the central axis in the edge region between this side surface and the base surface assigned thereto or the side surface adjacent to said side surface. The corresponding corner edge then has a transition region which is raised relative to the drawn-in main lip and the adjacent likewise drawn-in secondary lip.

In the central region between the two cutting body halves adjacent to one another in each case, the secondary lips of side surfaces adjacent to one another are directed past one another in a partly overlapping but spaced-apart manner. In this central region, the lip ends, directed past one another in a spaced-apart manner, of the secondary lips form an offset surface in each of these two adjacent side surfaces. These two offset surfaces are disposed at an angle, expediently at an obtuse angle or approximately at a right angle, to one another.

A multi-edged, rotatable and reversible cutting insert in which the secondary lips of side surfaces adjacent to one another are directed past one another in a spaced-apart manner at the ends and while forming offset surfaces disposed at an angle to one another is already inventive on its own. This design of the secondary lips of such a cutting insert therefore represents an independent invention.

On account of the four identical side surfaces and of the two identical base surfaces delimiting said side surfaces, the cutting insert according to the invention has 90° symmetry. The lips, effective as main and secondary lips, or cutting edges of the cutting insert can therefore be brought into use one after the other by a respective 90° rotation of the cutting insert in a tool holder before the cutting insert is reversed in the tool holder by 180° in order to bring into use the other four lips by corresponding 90° rotations. For this purpose, the cutting insert, suitable in particular as a tangential cutting insert, is arranged on end in the tool holder with respect to the longitudinal axis of the workpiece to be machined.

An especially preferred tool holder for such an eight-edged, rotatable and reversible cutting insert or tangential cutting insert has a recess as tip seat, comprising a bearing surface for the cutting insert to bear against with its base surfaces, and two seating regions arranged substantially at right angles relative thereto and to one another and intended for the cutting insert to bear against with its side surfaces. These seating regions are designed for the respective side surface to bear against with its bearing surface. In this case, the seating regions expediently have a supporting region designed like an impression of the level or planar bearing surfaces of the identical side surfaces. By means of this geometry of the recess, effective as a tip seat, of the tool holder, for example of, in particular, a turning tool, the high forces produced during the machining are reliably introduced into the tool holder and are therefore absorbed by the latter in order to ensure a non-destructible tip seat.

During the machining of a workpiece with such a cutting insert, especially good chip formation and an especially large chip breaking region are achieved on account of the chip pockets incorporated or formed in the side surfaces. In addition, an increased chip volume by means of a comparatively smooth cut with a positive radial rake angle and increased variability on account of a setting angle of greater than 90° can be realized.

The cutting insert according to the invention is advantageously produced as a pressed or die-cast part. A grinding operation normally required following a pressing operation for such a cutting body in a further machining step can therefore be dispensed with.

BRIEF DESCRIPTION OF THE DRAWINGS

Exemplary embodiments of the invention are explained in more detail below with reference to a drawing, in which.

DETAILED DESCRIPTION OF THE INVENTION

Figure 1:
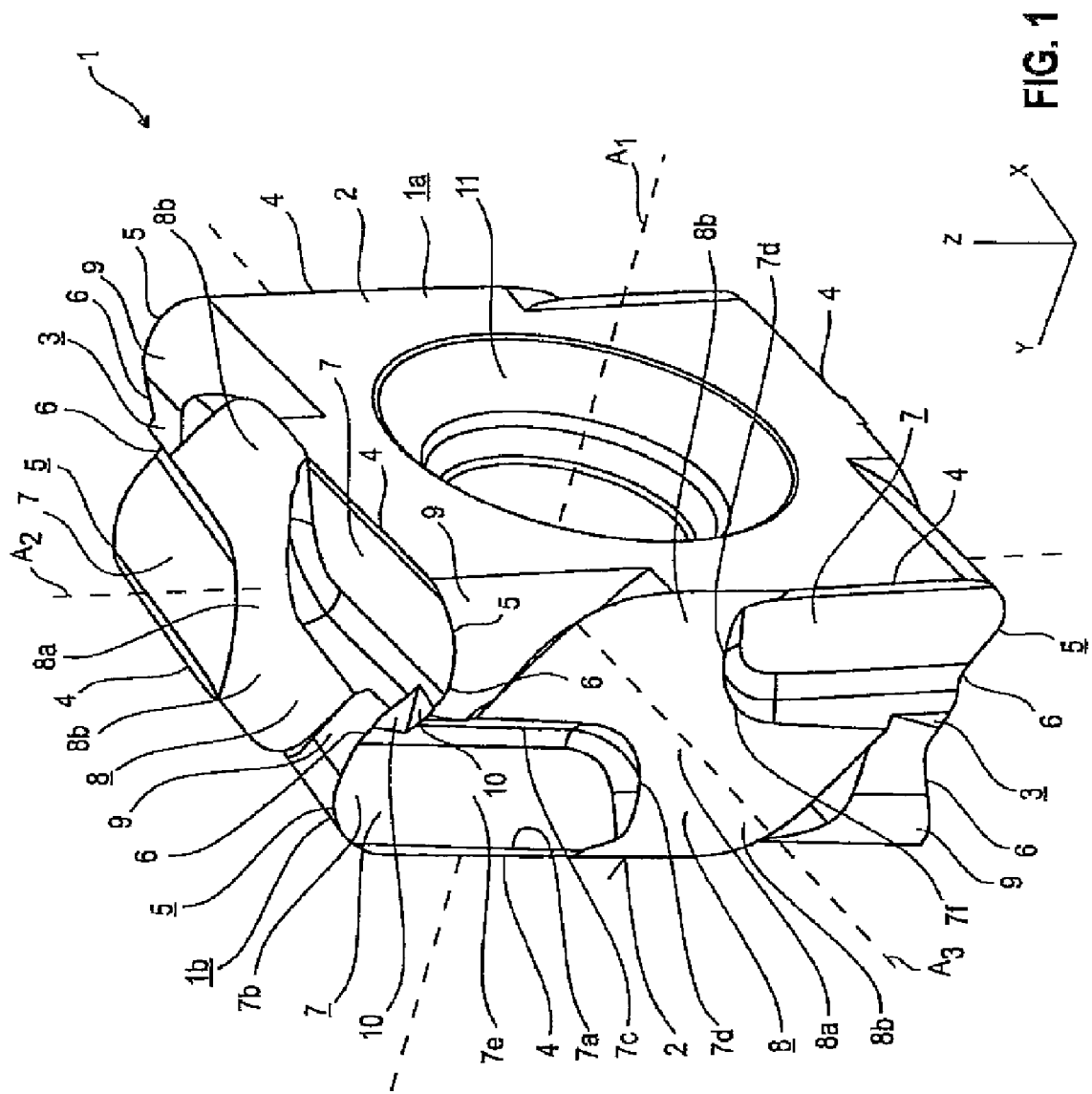
FIG. 1 shows, in a perspective view, an eight-edged cutting insert having cutting body halves twisted relative to one another and having bearing surfaces provided in the identical side surfaces and waisted in a hyperbolic-like manner in the region of the surface center.

Parts corresponding to one another are provided with the same reference numerals in all the figures.

According to FIGS. 1 to 3, the tangential cutting insert 1, which is designated below as cutting insert, has two opposite, identical and substantially square base surfaces 2 and four identical side surfaces 3, of which two adjacent side surfaces 3 can be seen. With respect to the coordinate system (x, y, z) shown, the central tip axis or central axis $A_1$ perpendicular to the base surfaces 2 runs in the y direction. An axis $A_2$ perpendicular thereto runs in the z direction and is disposed perpendicularly to two opposite side surfaces 3. An axis $A_3$ which is perpendicular to both the central axis $A_1$ and this axis $A_2$ and which runs perpendicularly to the other two opposite side surfaces 3 runs in the x direction. The center plane of the cutting tip 1 is located in the plane defined by the axes $A_2$ and $A_3$ normal to the side surfaces 3, the two base surfaces 2 being spaced equidistantly from this center plane along the central axis $A_1$.

Figure 5:
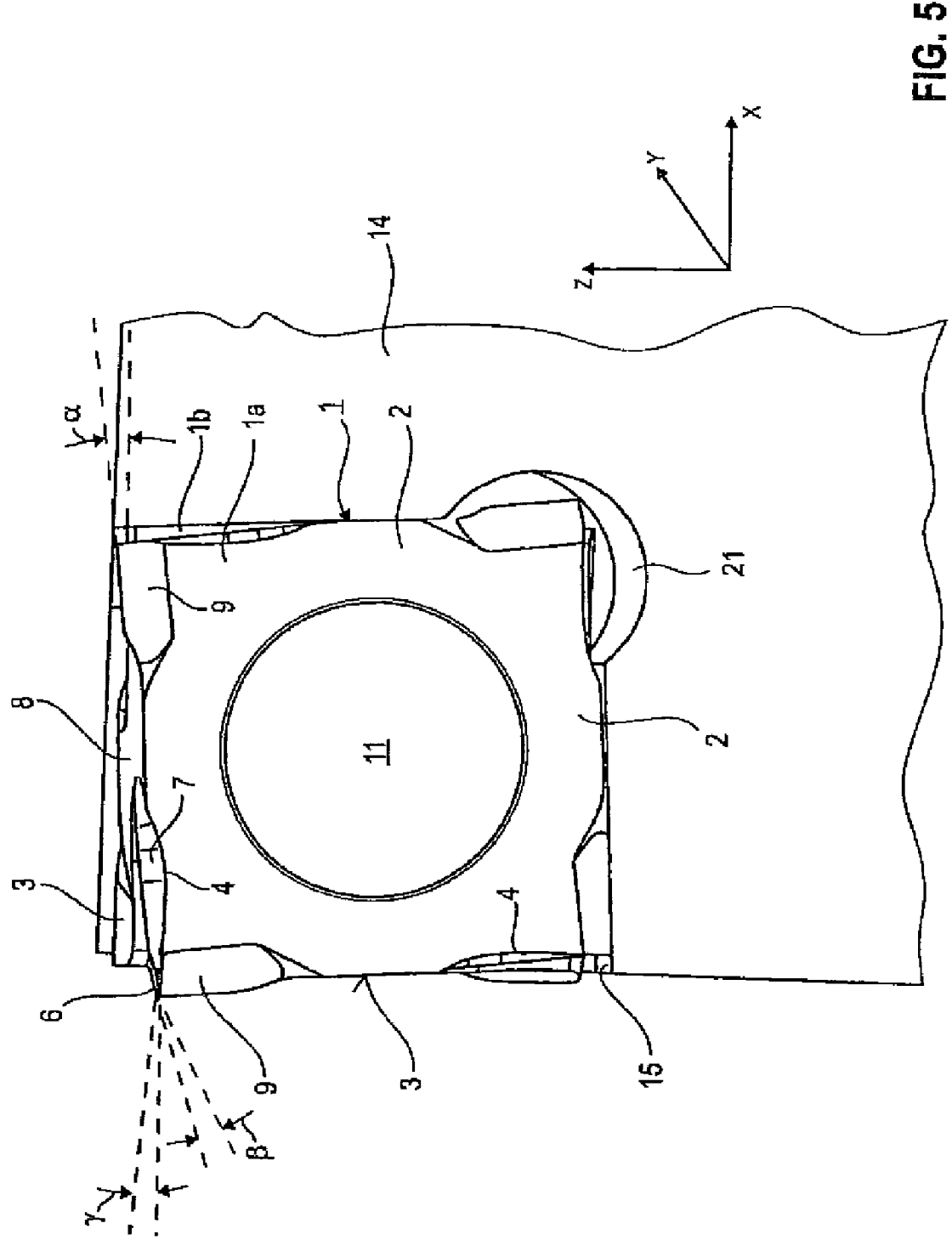
FIG. 5 shows the tool holder with inserted cutting insert (tangential cutting insert) in a side view.

The two base surfaces 2 are twisted relative to one another about the central axis $A_1$ as can be seen comparatively clearly from FIG. 5. The twist angle α of the two base surfaces 2 should in principle be greater than 0° and less than 20° and is in particular (10±5)°. The twist angle α is preferably within the region of a conventional or typical clearance angle of about 6° and is preferably about 8°. On account of the base surfaces 2 twisted relative to one another in each case by about 4° with respect to the x direction, and likewise the z direction, virtually two cutting body halves 1a and 1b are formed, said cutting body halves 1a and 1b being adjacent to one another or merging into one another in the center plane (xz plane) defined by the two axes $A_2$ and $A_3$.

Each of the identical side surfaces 3 forms with each base surface 2 a main lip 4. The latter extends only over part of the length of the respective side surface 3. In addition, each side surface 3 has opposite, rounded-off or curved corner edges 5. Said corner edges 5 form a secondary lip 6 adjacent to the respective main lip 4 and extending into the side surface 3 adjacent to this side surface 3. A chip groove 7 is assigned to each of these cutting edges formed from main lip 4, corner edge 5 and secondary lip 6. Said chip groove 7 is designed as a chip pocket drawn into the respective side surface 3, i.e. arched inward toward the central axis $A_1$. Two chip grooves 7, also designated below as chip pockets, as well as the assigned main lips 4, the corner edges 5 and the secondary lips 6, therefore lie diagonally opposite one another within the respective side surface 3.

Each chip pocket 7 has a pocket ridge 7a drawn up to the respective main lip 4, i.e. drawn up with respect to a pocket bottom 7e, and a pocket ridge 7b brought up to the respective secondary lip 6 and also a pocket ridge 7c facing the other respective chip pocket 7 of this side surface 3, and a chip groove or chip pocket end 7d. The chip groove end 7d, which is located inside the respective side surface 3, is spaced apart from the next adjacent side surface 3. This chip groove or chip pocket end 7d is likewise formed by a pocket ridge raised relative to the pocket bottom 7e.

A bearing surface 8 is formed between the two chip grooves or chip pockets 7 of the respective side surface 3. This planar or level bearing surface 8 raised relative to the chip pockets 7 extends symmetrically beyond the chip groove ends 7d of the adjacent chip groove 7 and transversely to the main lips 4 until it adjoins the latter. The main lips 4, starting from the respective corner edge 5, therefore run along the bearing surface 8 right up to a rounded-off edge region 9 provided between this side surface 3 and the base surface 2 assigned to the main lip 4. Said edge region 9 ends virtually in the rounded-off or curved corner edge 5 of the respectively adjacent side surface 3. There, the rounded-off edge region 9 forms at least a section of a secondary flank for the secondary lip 6 of the adjacent side surface 3.

In its basic shape, the respective bearing surface 8 is in principle oval, circular or elliptical. In the region of the surface center of the respective side surface 3, the bearing surface 8 has a waisted surface region 8a drawn in in a hyperbolic-like manner. Widened surface regions 8b adjoin this waisted surface region 8a rotationally symmetrically to the respective axis $A_2$, $A_3$. The four identical bearing surfaces 8 of the four identical side surfaces 3 therefore have virtually the shape of a battle-axe. The bearing surface 8 in this shape or geometry is therefore twisted about the respective axes $A_2$ and $A_3$ perpendicular to the side surfaces 3 opposite one another in each case.

The chip grooves or chip pockets 7 directly adjoin the central waisted surface region 8a of the bearing surface 8. The respective chip groove 7 therefore has a rounded-off, circular or curved groove corner 7f which is diagonally opposite the respective corner edge 5 and with which this chip groove or chip pocket 7 adjoins the bearing surface 8. The respective rounded-off groove corner 7f therefore forms at least part of the groove or pocket end 7d. In this variant, the chip grooves 7 extend between the main and secondary lips 4 and 6, respectively, and the waisted central surface region 8a of the bearing surface 8 and also that surface region or section of the rounded-off edge region 9 which forms the secondary flank for the secondary lip 6 of the respectively adjacent side surface 3.

The secondary lips 6 of the side surfaces 3 adjacent to one another overlap in a spaced-apart manner—in the planes of the respective side surface 3. The two secondary lips 6 therefore do not merge into one another either directly or indirectly, but rather run in a spaced-apart manner, with offset surfaces 10 being formed. These offset surfaces 10 are located in the plane of the corresponding side surface 3 and are therefore disposed at right angles or at an obtuse angle to one another.

Figure 4:
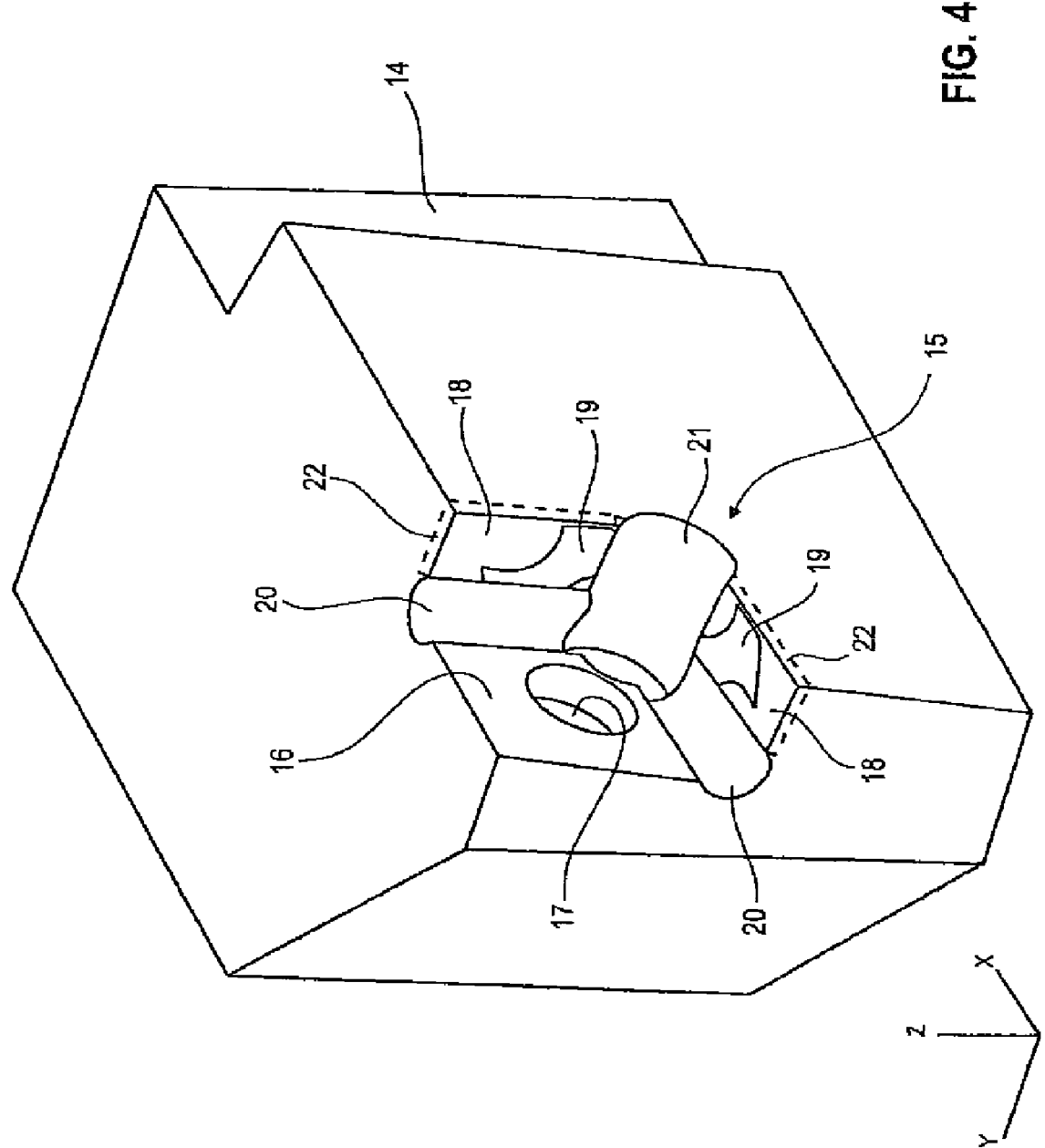
FIG. 4 shows a tool holder for accommodating such a cutting insert, in a perspective view.

A central hole 11 which passes through the cutting tip 1 along the central axis $A_1$ serves to accommodate a fixing element (not shown), for example a screw or a bolt, for tightening and/or clamping the cutting insert 1 in a tool holder, shown in FIGS. 4 and 5, of a turning tool.

The cutting insert 1 shown in FIG. 2 again corresponds to the cutting insert 1 according to FIG. 1, wherein, in contrast to the cutting insert 1 shown there, the bearing surface 8 has two diagonally opposite wedge-shaped surface regions 12. These surface regions 12 adjoin the respective chip groove or chip pocket end 7d of the chip groove or chip pocket 7 located in the same cutting body half 1a, 1b. These level surface regions 12 symmetrical with respect to the axis $A_2$ or $A_3$ extend, starting from their widened surface ridge 12a facing the waisted surface region 8a and adjoining the latter, with their surface tip 12b, opposite said surface ridge 12a, right up to the respective secondary lip 6 of the adjacent side surface 3 in this cutting tip half 1a or 1b and form there the or a further section of the secondary flank. In this variant, the chip grooves 7 extend between the main and secondary lips 4 and 6, respectively, and the waisted central surface region 8a of the bearing surface 8 and also the wedge-shaped surface region 12 thereof.

Figure 3:
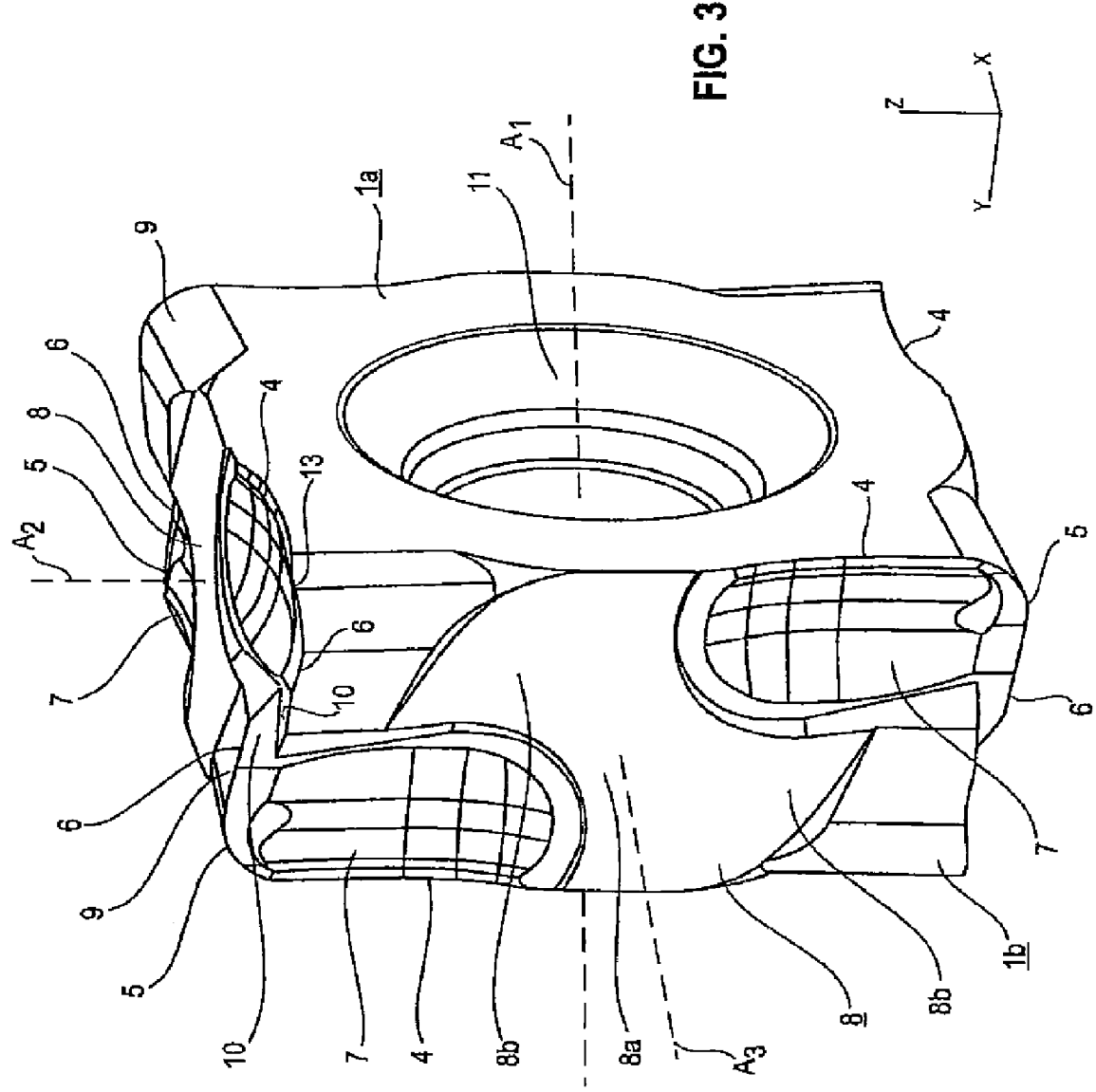
FIG. 3 shows, in a perspective view, an embodiment of the cutting insert according to FIG. 1 having drawn-in or inwardly arched main lips and drawn-in or inwardly arched secondary lips.

The cutting insert 1 shown in FIG. 3 differs from the cutting insert according to FIG. 1 in that the respective main lip 4 and the respective secondary lip 6 are arched (concavely) inward, i.e. are drawn in toward the central axis $A_1$. As a result of this geometry, the transition region between the main lip 4 and the secondary lip 6 represents the highest cutting edge point 13 within the corner edge 5. With respect to the plane defined by the central axis $A_1$ and the axis $A_2$ or the axis $A_3$, the cutting edge point 13 and thus the corner edge 5 are further away than that cutting edge region of the drawn-in or inwardly arched main lip 4 and/or secondary lip 6 which is at the smallest or minimum cutting edge distance from the central axis $A_1$.

FIG. 4 shows, in perspective, a tool holder 14 for such an eight-edged, rotatable and reversible cutting insert 1. To this end, the tool holder 14 has a recess 15 as tip seat for the cutting insert 1. The tool holder 14 designed as a turning tool and having inserted cutting insert 1 is shown in FIG. 5 in a side view of a side surface 3.

The recess 15 has a bearing surface 16, against which the cutting insert 1 bears with its base surface 2. A tapped hole 17 in the region of this bearing surface 16 serves to accommodate the fixing screw (not shown) which passes through the central hole 11 in the cutting insert 1 and by means of which the cutting insert 1 is tightened inside the recess 15 against this bearing surface 16 in the fitted state. In addition, the recess 15 has two seating regions 18 arranged substantially at right angles to one another and intended for the cutting insert 1 to bear against with in each case two side surfaces 3 adjacent to one another.

Provided in the region of each of these seating regions 18 is a supporting region or a supporting surface 19 with which the respective side surface 3 is in contact merely in the region of the bearing surface 8 in the corresponding seating region 18 of the recess 15. Circular-arc-shaped corner regions 20 and 21 of the recess 15 form locating regions which are drawn into the tool holder 14 and in which those main lips 4, secondary lips 6 or corner edges 5 of the cutting body 1 which are formed between the side surfaces 3 resting in the recess 15 and the base surface 2 bearing against the bearing surface 16 rest.

The or each seating region 18 may also be formed by a, for example plate-like, seating element 22 (shown by broken lines) as an additional rest which is inserted into the recess 15 and fixed there. Such an additional seating element 22 preferably made of a hard material is advantageous in particular during heavy-duty cutting.

As can be seen comparatively clearly from FIG. 5, the cutting insert 1 is arranged on end in the tool holder 14 with respect to the longitudinal axis, running in the y direction, of the workpiece (not shown) to be machined. The main and secondary lips 4 and 6, respectively, which are in use in this arrangement of the cutting tip 1 certainly lead in principle to a negative radial rake angle on account of the negative position of the cutting tip 1 in the tool holder 14 and as a result of the base side 2 which is in use and which is twisted relative to the base surface 2 bearing against the bearing surface 16 of the recess 15. However, the drawn-in configuration or geometry of the secondary lip 6 according to the embodiment in FIG. 3 leads overall to a positive rake angle $\beta$.

Figure 2:
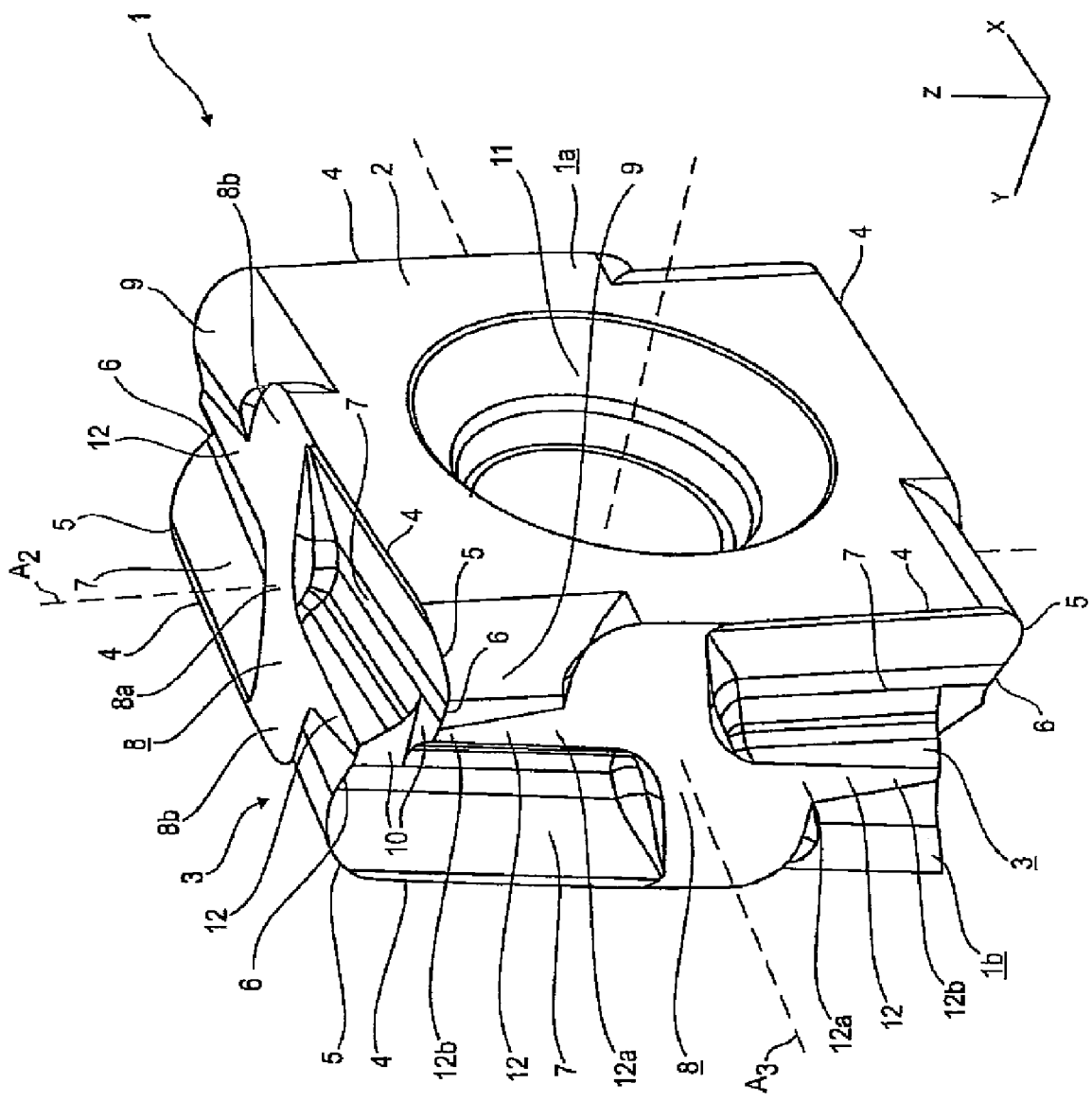
FIG. 2 shows, in a perspective view, a variant of the cutting insert having additional wedge-shaped surface regions of the bearing surfaces.

The relationships are also similar with regard to the axial rake angle, which, in a corresponding fitted position of the cutting insert 1 as shown in FIGS. 1 and 2, likewise leads in principle to a negative rake angle corresponding to the inclination or twist angle α. However, the drawn-in or sunken configuration or geometry of the main lip 4 according to the embodiment in FIG. 3 again leads overall to a positive axial rake angle γ. In this configuration of the cutting insert 1 and its arrangement in the tool holder 14, said cutting insert 1 is effective as a tangential cutting insert 1 with both a positive axial rake angle γ and a positive radial rake angle β.

The chip breaker surfaces designed as chip pockets 7 and therefore as chip breaker surfaces dished in a pocket-like manner, i.e. arched inward into the respective side surface 3 toward the central axis $A_1$, ensure especially reliable chip disposal when the workpiece is being turned. As a result of the symmetrical bearing surface 8, especially suitable supporting points or supporting regions 19 for a reliable tip seat of the plate-like cutting tip 1 (cutting tip) in the tool holder 14 are produced.

The invention claimed is:

1. An eight-edged rotatable and reversible cutting insert comprising two opposite, substantially square base surfaces which are twisted relative to one another about a central axis running perpendicularly to said base surfaces, and having four identical side surfaces, wherein a main lip is formed between each base surface and each side surface, wherein:
   a) each side surface has two diagonally opposite corner edges which form a secondary lip adjacent to the respective main lip,
   b) each side surface has two chip grooves which, starting from the respective corner edge, extend along the associated main lip up to a rear groove end, and
   c) a bearing surface is formed between the chip grooves, said bearing surface extending symmetrically beyond the groove ends of the adjacent chip groove and transversely to the main lips until it adjoins the latter.

2. The cutting insert as claimed in claim 1, wherein the main lip extends only over part of the length of the side surface.

3. The cutting insert as claimed in claim 1, wherein the main lip extends between the associated corner edge and a rounded-off edge section of this base surface.

4. The cutting insert as claimed in claim 1, wherein the corner edges are rounded off and in particular are of circular or curved design.

5. The cutting insert as claimed in claim 1, wherein the bearing surface extends in the longitudinal direction of the main lips over the entire side surface.

6. The cutting insert as claimed in claim 1, wherein the bearing surface has a substantially circular or oval surface contour having a waisted central surface region.

7. The cutting insert as claimed in claim 6, wherein the bearing surface, in a rotationally symmetrical manner with respect to the waisted central surface region, has two wedge-shaped surface regions, the respective surface tip of which is brought up to the secondary lip of the adjacent side surface.

8. The cutting insert as claimed in claim 7, wherein the chip grooves are formed between the waisted central surface region and the wedge-shaped surface regions.

9. The cutting insert as claimed in claim 1, wherein the respective chip groove has an in particular rounded-off, circular or curved groove corner which is diagonally opposite the respective corner edge and with which this chip groove adjoins the bearing surface.

10. The cutting insert as claimed in claim 1, wherein the chip grooves are designed as chip pockets drawn into the side surface.

11. The cutting insert as claimed in claim 10, wherein the chip pockets, starting from the respective corner edge, extend along the main lip assigned to said corner edge up to a rear chip pocket end.

12. The cutting insert as claimed in claim 1, wherein a secondary flank is formed by the rounded-off edge section and/or by the bearing surface, in particular the wedge-shaped surface region thereof, and intended for the secondary lip of the adjacent side surface.

13. The cutting insert as claimed in claim 1, wherein the respective main lip and/or the respective secondary lip are/is arched inward toward the central axis.

14. The cutting insert as claimed in claim 1, wherein the secondary lips of side surfaces adjacent to one another are spaced apart at the ends and are directed past one another, with offset surfaces disposed at an angle to one another being formed.

15. A tool holder having an eight-sided rotatable and reversible cutting insert, wherein the cutting insert has two opposite, substantially square base surfaces which are twisted relative to one another about a central axis running perpendicularly to said base surfaces, and having four identical side surfaces, wherein a main lip is formed between each base surface and each side surface, wherein:
   a) each side surface has two diagonally opposite corner edges which form a secondary lip adjacent to the respective main lip,
   b) each side surface has two chip grooves which, starting from the respective corner edge, extend along the associated main lip up to a rear groove end, and
   c) a bearing surface is formed between the chip grooves, said bearing surface extending symmetrically beyond the groove ends of the adjacent chip groove and transversely to the main lips until it adjoins the latter.

16. The tool holder as claimed in claim 15, wherein the tool holder has a recess as tip seat, comprising a bearing surface for the cutting insert to bear against with its base surfaces, and comprising two seating regions arranged substantially at right angles to one another and intended for the cutting insert to bear against with two of its side surfaces, wherein the seating regions are designed for the respective side surface to bear against with its bearing surfaces.

17. The tool holder as claimed in claim 16, wherein the seating regions have a supporting region designed like an impression of the bearing surface of the side surfaces.

18. The tool holder as claimed in claim 16, wherein the or each seating region is formed by a seating element inserted into the recess and made in particular of a hard material.

19. The tool holder as claimed in claim 15, wherein the recess has a substantially square bearing region for the cutting insert to bear against with its base surface.

* * * * *